(12) United States Patent
Mehta et al.

(10) Patent No.: US 10,063,382 B1
(45) Date of Patent: Aug. 28, 2018

(54) APPARATUS AND METHOD FOR PROVIDING MULTIPLE SECURITY CREDENTIALS

(71) Applicant: General Electric Company, Schenectady, NY (US)

(72) Inventors: Arun Mehta, San Ramon, CA (US); Gowtham Ranganath, San Ramon, CA (US); Leo Chu, San Ramon, CA (US); Atul Kshirsagar, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/718,534

(22) Filed: Sep. 28, 2017

(51) Int. Cl.
 *H04L 9/32* (2006.01)
 *H04L 29/06* (2006.01)
(52) U.S. Cl.
 CPC ........ *H04L 9/3268* (2013.01); *H04L 63/0853* (2013.01); *H04L 63/10* (2013.01)
(58) Field of Classification Search
 CPC .... H04L 9/3268; H04L 63/10; H04L 63/0853
 See application file for complete search history.

(56) References Cited

U.S. PATENT DOCUMENTS

| | | | | |
|---|---|---|---|---|
| 8,086,710 B2* | 12/2011 | Vanyukhin | .............. | H04L 41/00 709/218 |
| 8,132,246 B2* | 3/2012 | Ilac | ........................ | H04L 9/0822 726/10 |
| 8,327,426 B2* | 12/2012 | Kinser | .................... | G06F 21/33 726/12 |
| 8,429,712 B2* | 4/2013 | Robinson | ................ | H04L 63/08 380/255 |
| 9,106,634 B2* | 8/2015 | Mendelovich | .......... | G06F 21/33 |
| 9,736,153 B2* | 8/2017 | McDaniel | ........... | H04L 63/0884 |
| 2007/0143836 A1* | 6/2007 | Bowers | ............... | H04L 63/0807 726/10 |

* cited by examiner

*Primary Examiner* — Beemnet Dada
(74) *Attorney, Agent, or Firm* — Fitch Even Tabin & Flannery LLP

(57) ABSTRACT

A request is received from a requestor for security credentials. An initial credential authority is selected based upon a first predetermined criteria. When the initial credentials authority is not available, a back-up credentials authority is chosen based upon a second predetermined criteria. The security credentials are obtained from the back-up certificate authority. The security credentials are transmitted to the requestor.

12 Claims, 5 Drawing Sheets

US 10,063,382 B1

APPARATUS AND METHOD FOR PROVIDING MULTIPLE SECURITY CREDENTIALS

BACKGROUND OF THE INVENTION

Field of the Invention

The subject matter disclosed herein generally relates to security infrastructure, and, more specifically, to devices and approaches that provide security certificates used in this infrastructure.

Brief Description of the Related Art

The public key infrastructure (PKI) is the set of devices, processes, networks, applications, and other entities that manages keys and certificates. A public key certificate, also known as a digital certificate or identity certificate, is an electronic document used to prove the ownership of a public key. Devices, applications, and other processes utilize these certificates to, for example, access data. The certificates themselves may be obtained from security or certificate authorities.

Additionally, services (e.g., PKI certificate services) are used to obtain the public key certificate from the certificate authorities. Current PKI certificate services rely on the availability of single certificate authorities. Unfortunately, if the certificate authority goes off-line, otherwise becomes unavailable, or decides not to provide the certificate to the requestor, then the requestor is unable to perform a function. For example, without a certificate the requestor may not be able to access certain data. Other problems may also occur.

BRIEF DESCRIPTION OF THE INVENTION

The present invention is directed to approaches that allow a certificate or other security credentials service to transparently support multiple different certificate authorities on the backend in a way that is transparent and seamless to users.

In many of these embodiments, a request is received from a requestor for security credentials. An initial credential authority is selected based upon a first predetermined criteria. When the initial credentials authority is not available, a back-up credentials authority is chosen based upon a second predetermined criteria. The security credentials are obtained from the back-up certificate authority. The security credentials are transmitted to the requestor.

In aspects, the requestor is a device or a software application. In other aspects, the requestor is an industrial machine that is disposed at an industrial site.

In some examples, the security credentials comprise a PKI certificate. In other examples, the first predetermined criteria relates to the position of the initial credentials authority on a list of potential credentials authorities. In some other examples, the second predetermined criteria also relates to the position of the initial credentials authority on the list of potential credentials authorities. Other examples are possible.

In some aspects these approaches are executed at the cloud. In other examples, these approaches are executed at a remote industrial site. In some other examples, the initial credentials authority and the back-up credentials authority are certificate authorities.

In others of these embodiments, an apparatus includes an electronic interface, a data storage device, and a control circuit. The electronic interface includes an input and an output. The interface is configured to receive a request from a requestor for security credentials at the input.

The data storage device is configured to store a first predetermined criteria and a second predetermined criteria. The first predetermined criteria relates to the position of the initial credentials authority on a list of potential credentials authorities. In some other examples, the second predetermined criteria also relates to the position of the initial credentials authority on the list of potential credentials authorities. Other examples are possible.

The control circuit is coupled to the electronic interface and the data storage device. The control circuit is configured to select an initial credential authority based upon the first predetermined criteria. The control circuit is further configured to, when the initial credentials authority is not available, choose a back-up credentials authority based upon the second predetermined criteria. The control circuit is additionally configured to obtain the security credentials from the back-up certificate authority via the output, and to transmit the received security credentials to the requestor via the output.

BRIEF DESCRIPTION OF THE DRAWINGS

For a more complete understanding of the disclosure, reference should be made to the following detailed description and accompanying drawings wherein.

DETAILED DESCRIPTION OF THE INVENTION

The approaches described herein automatically and transparently select a certificate or other security credentials service. In aspects and when a connection to a certificate authority is lost, or the certificate authority is otherwise unavailable, a requestor is still able to obtain a certificate without interruption.

The present approaches provide multi-CA support. A multi-CA PKI service is provided, and a third party can plug-in their CA to this service and achieve zero (or next to zero) downtime in obtaining certificates. The PKI service described herein can support multiple CAs and provide high availability. When the multi-CA PKI service is implemented in software, third party CA is seamlessly provided without changing a single line of code. The third party can choose to plug-in by using a REST API or a Java API.

The approaches have applicability in various settings such as being used with the Predix service provided by the General Electric Company. One example implementation involves providing a failover service at the Predix cloud. A machine or appliance utilizes a certificate that it obtains a certificate from a CA at the Predix cloud. In the Predix cloud, the Symantec CA may be used for issuing certificates for all the edge (remote or local) devices. In aspects, Symantec availability is approximately 99.5%, but Predix platform availability is approximately 99.9%. To achieve the 99.9% availability, the approaches described herein are used when Symantec is not responding to requests. In this case, other public certificate authorities at the cloud (e.g., Digicert or Microsoft to mention two examples) or local certificate authorities (disposed at or near the machine) may be used.

In one specific example, the Edge Manager validates the request and passes the request to a Multi-CA PKI service. The Multi-CA PKI service checks as to whether the primary CA (e.g., the Symantec CA service) is active or not. If the primary CA is not active, then it passes the request to secondary CA (e.g., the Digicert/Microsoft PK service). The active CA issues a certificate to the requesting edge devices.

In another example, the Predix service is used and different CAs can be plugged into this service. In this example, a Predix appliance or machine utilizes a certificate. In aspects, the Predix appliance uses a local CA for obtaining a certificate. The local CA issues certificates to the Predix appliance and other edge devices. The local CA is not at the cloud and may be disposed locally at or near the appliance.

If the customer of Predix appliance wants to use a different CA other than local CA, the customer can plug-in their CA into the Predix service and start to use their service without changing anything in the current Predix software. Customers also can plug-in multiple CAs for failover and, in some examples (and as mentioned above), can achieve 99.9% or more availability by without changing the existing software.

Figure 1:
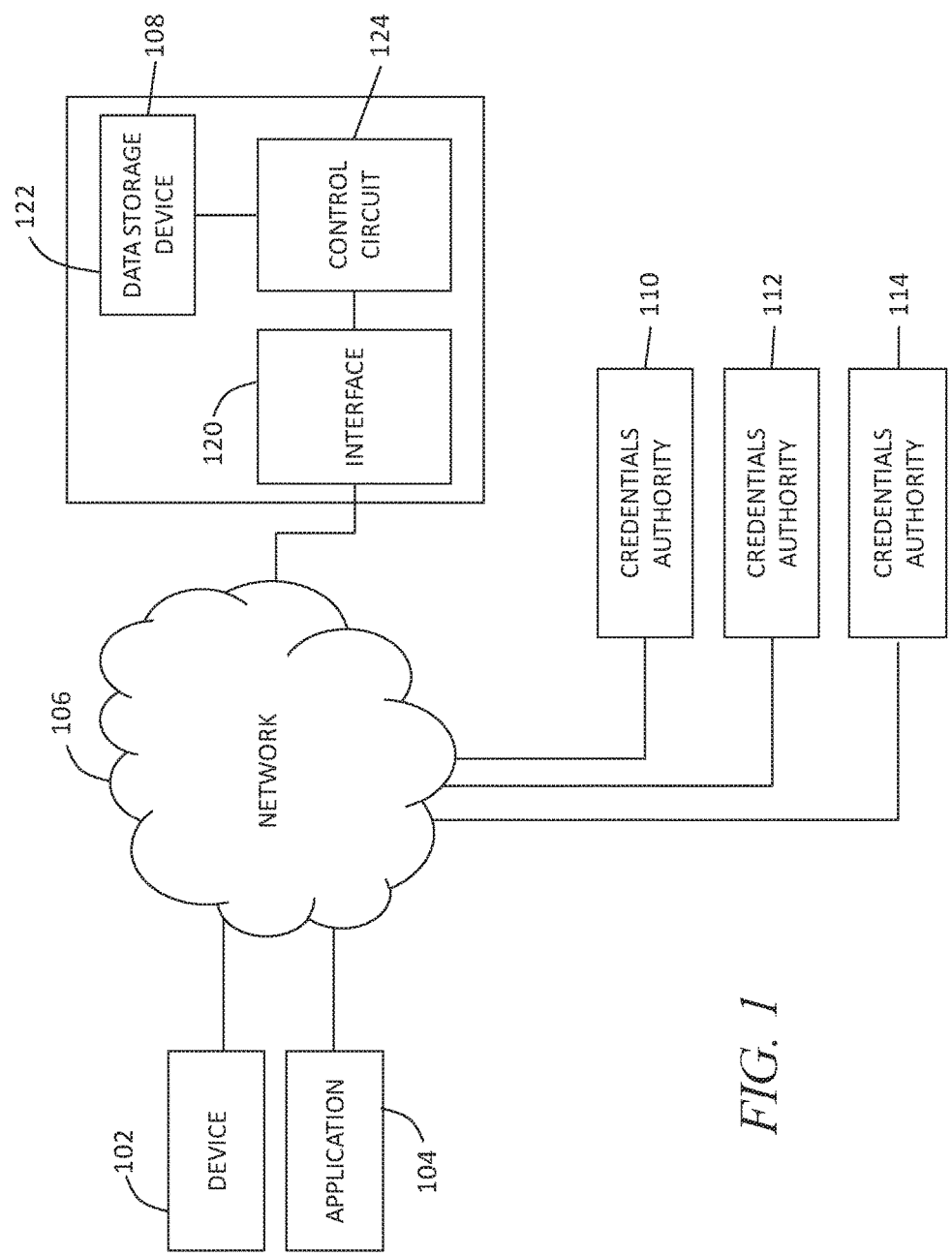
FIG. 1 comprises a block diagram of a system that selects a credentials authority according to various embodiments of the present invention.

Referring now to FIG. 1, one example of a system 100 that selects a credential authority is described. The system 100 includes a device 102, an application 104, a network 106, an apparatus 108 (including an electronic interface 120, a data storage device 122, and a control circuit 224), a first credentials authority 110, a second credentials authority 112, and a third credentials authority 114.

The device 102 may be any type of device such as an industrial machine, a personal computer, a laptop, a tablet, or a vehicle. The application 104 may be any type of software application program being performed. For example, the application 104 may be operated from an industrial machine, a personal computer, a laptop, a tablet, or a vehicle. The application 104 may allow interaction with a user. For example, the application 104 may process data, obtain data, and render data to the user. Other examples are possible.

The first credentials authority 110, second credentials authority 112, and third credentials authority 114 may provide any type of security credential (e.g., a PKI certificate). The standards for issuing a security credential are well-known to those skilled in the art and will not be repeated here.

The electronic interface 120, with an input and an output, transmits and receives information from and to the apparatus 108. The electronic interface 120 may be any combination of computer hardware and software.

The data storage device 122 is any type of memory storage device. The memory storage device 122 may store a first predetermined criteria and a second predetermined criteria.

The first predetermined criteria may be represented as combinations of algorithms and data structures that determine how an initial credentials authority is chosen. To take one specific example, the first predetermined criteria may be a set of rules implemented by computer instructions that a first CA on a list of multiple CAs is chosen as the initial CA, and the initial CA is contacted to obtain security credentials (certificates).

Similarly, the second predetermined criteria may be represented as combinations of algorithms and data structures that determine how a back-up credentials authority is chosen. To take one specific example, the second predetermined criteria may be a set of rules implemented by computer instructions such that another CA on a list of multiple CAs is chosen as the back-up CA after the initial CA is determined to not be available.

The control circuit 124 is coupled to the electronic interface 120 and the data storage device 122. The control circuit 124 is configured to select an initial credentials authority based upon the first predetermined criteria. The control circuit 124 is further configured to, when the initial credentials authority is not available, choose a back-up credentials authority based upon the second predetermined criteria. The control circuit 124 is additionally configured to obtain the security credentials from the back-up certificate authority via the output, and to transmit the received security credentials to the requestor via the output.

It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 124 may be configured (for example, by using corresponding programming stored in a memory as will be well understood by those skilled in the art) to carry out one or more of the steps, actions, and/or functions described herein.

Figure 2:
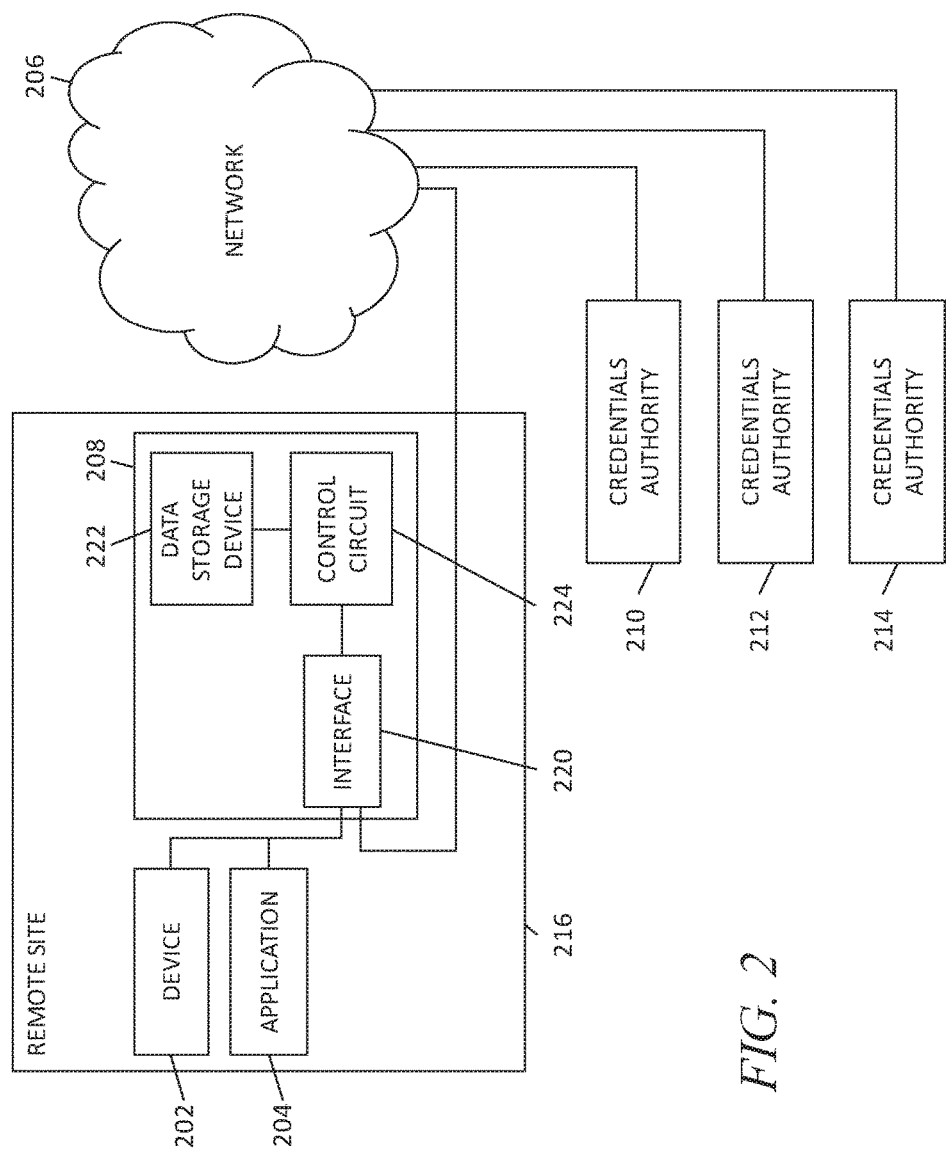
FIG. 2 comprises a block diagram of a system that selects a credentials authority according to various embodiments of the present invention.

Referring now to FIG. 2, an example of another system 200 that selects a credential service is described. The system 200 includes a device 202, an application 204, a network 206, an apparatus 208 (including an electronic interface 220, a data storage device 222, and a control circuit 224), a first credentials authority 210, a second credentials authority 212, and a third credentials authority 214. The device 202, application 204, and apparatus 208 are deployed at a remote site 216 (e.g., a factor, power plant, wind farm, office, or school to mention a few examples).

The device 202 may be any type of device such as an industrial machine, a personal computer, a laptop, a tablet, or a vehicle. The application 204 may be any type of software application program being performed. For example, the application 204 may be operated from an industrial machine, a personal computer, a laptop, a tablet, or a vehicle. The application 204 may allow interaction with a user. For example, the application 204 may process data, obtain data, and render data to the user. Other examples are possible.

The first credentials authority 210, second credentials authority 212, and third credentials authority 214 may provide any type of security credential (e.g., a PKI certificate). The standards for issuing a security credential are well-known to those skilled in the art and will not be repeated here.

The electronic interface 220, with an input and an output, transmits and receives information from and to the apparatus 208. The electronic interface 220 may be any combination of computer hardware and software.

The data storage device 222 is any type of memory storage device. The memory storage device 222 may store a first predetermined criteria and a second predetermined criteria.

The first predetermined criteria may be represented as combinations of algorithms and data structures that determine how an initial credentials authority is chosen. To take one specific example, the first predetermined criteria may be a set of rules implemented by computer instructions that a first CA on a list of multiple CAs is chosen, and the initial CA is contacted to obtain credentials.

Similarly, the second predetermined criteria may be represented as combinations of algorithms and data structures that determine how a back-up credentials authority is chosen. To take one specific example, the second predetermined criteria may be a set of rules implemented by computer instructions that another CA on a list of multiple CAs is chosen as the back-up CA after the initial CA is determined to not be available.

The control circuit 224 is coupled to the electronic interface 220 and the data storage device 222. The control circuit 224 is configured to select an initial credentials authority based upon the first predetermined criteria. The control circuit 224 is further configured to, when the initial credentials authority is not available, choose a back-up credentials authority based upon the second predetermined criteria. The control circuit 224 is additionally configured to obtain the security credentials from the back-up certificate authority via the output, and to transmit the received security credentials to the requestor via the output.

Figure 3:
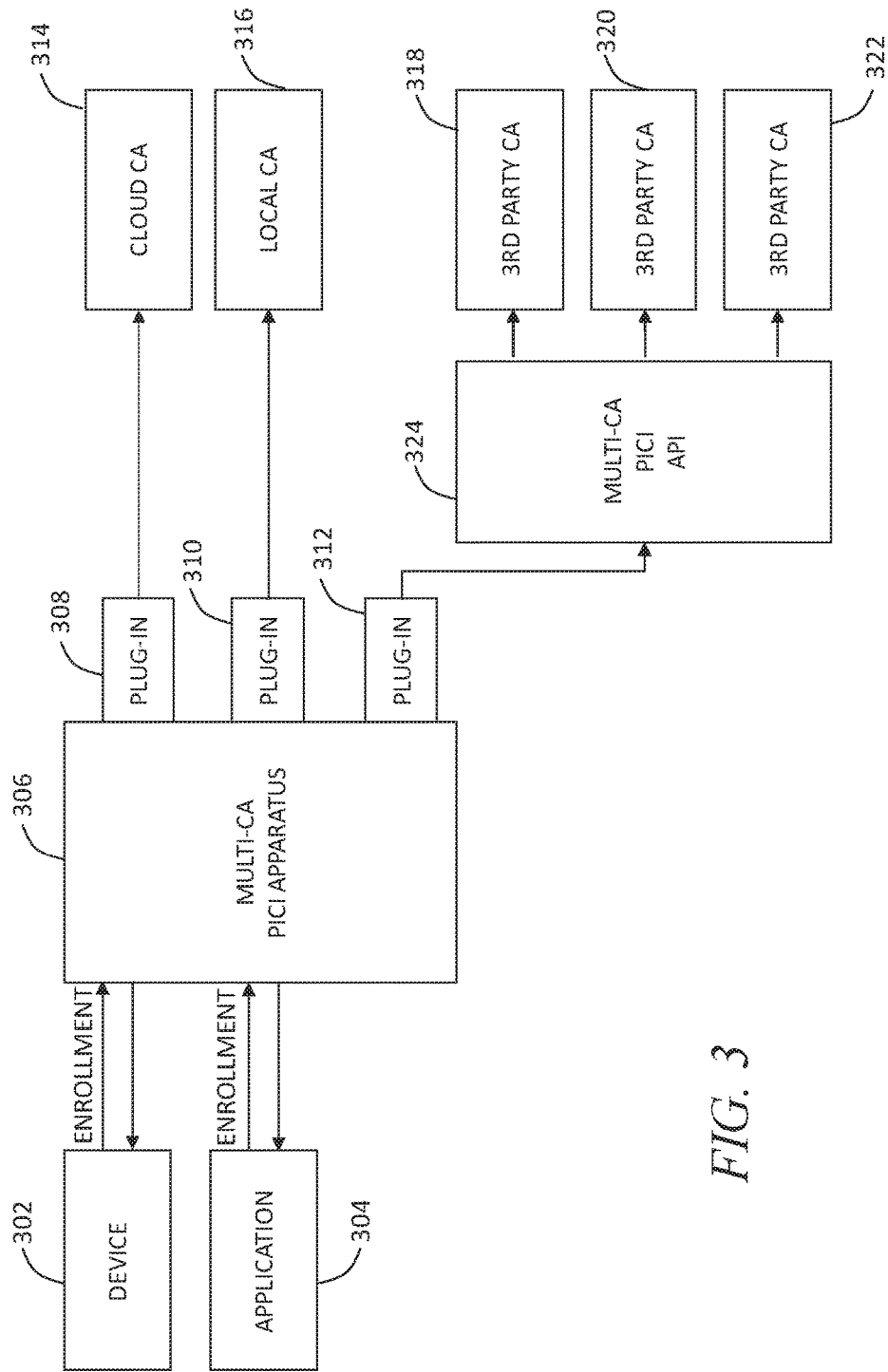
FIG. 3 comprises a block diagram of a system that selects a credentials authority according to various embodiments of the present invention.

Referring now to FIG. 3, an example of another system 300 that selects a credentials authority is described. The system 300 includes a device 302, an application 304, a multi-ca PKI application 306 (with plug-ins 308, 310, and 312), certificate authorities 314, 316, 318, 320, and 322, and a multi-CA PKI application programming interface 324.

The device 302 may be any type of device such as an industrial machine, a personal computer, a laptop, a tablet, or a vehicle. The application 304 may be any type of software application program being performed. For example, the application 304 may be operated from an industrial machine, a personal computer, a laptop, a tablet, or a vehicle. The application 304 may allow interaction with a user. For example, the application 304 may process data, obtain data, and render data to the user. Other examples are possible.

The CAs 314, 316, 318, 320, and 322 may be any type of certificate authority that receives a request and, responsively issues a certificate (e.g., a PKI certificate). The standards for issuing a certificate are well-known to those skilled in the art and will not be repeated here.

The multi-CA PKI application 306 is configured to determine an initial CA. For example, a list may be examined and a criteria used (e.g., identify the first CA on the list) to determine the initial CA. Once an initial CA is determined, the multi-CA PKI application 306 determines if the CA is available. In aspects, a message may be sent to the CA from the multi-CA PKI application 306 to determine availability. In other aspects, the CA may periodically report its status to the multi-CA PKI application 306 and this status may be examined by the multi-ca PKI application 306 to determine availability. When the initially-selected CA is available then the certificate is obtained from the CA by the multi-CA PKI application 306 and the certificate is sent to the requestor by the multi-CA PKI application 306.

When the initially-selected CA is not available, a back-up CA is chosen by the multi-CA PKI application 306. For example, the list is consulted again and the next CA on the list is selected. The multi-CA PKI application 306 may repeat these actions until an available CA is determined or until the list is exhausted.

The plug-ins 308, 310, and 312 are, in aspects, software programs that allow the multi-CA PKI application 306 to communicate with other entities. The plug-ins 308, 310, and 312 are portable, and can be easily installed by users into the multi-CA PKI application 306 to customize the operation of the multi-CA PKI application 306. The plug-in 308 allows communication with the CA 314 (which is a CA located at the cloud network). The plug-in 310 allows communication with the local CA 316 (located in the same local area or site as the multi-CA PKI application 306). The plug-in 312 allows communication with the API 324.

In aspects, the API 324 is a software program that provides a set of clearly defined methods of communication between CAs 318, 320, and 322, and the multi-CA PKI service 306. The API 324 further resolves information received from the multi-CA PKI service 306. For example, the multi-CA PKI service 306 may select a CA with a MAC address and an IP address. The MAC address corresponds to the CA 318, while the IP address corresponds to CA 320. The API maps information received from the multi-CA PKI service 306 to a specific CA (in this case CA 318, 320 or 322).

By using the Multi-CA PKI service 306, any client can plug-in their CA or third party CA to the Multi-CA PKI 306. This solves the problem of tying down certificate requests to only one CA. This also ensures the high availability of PKI certificates by automatically changing over to secondary CA when the first CA is unavailable. In other words, when one CA is down, certificate service 306 can point to another CA until the main CA comes up.

Figure 4:
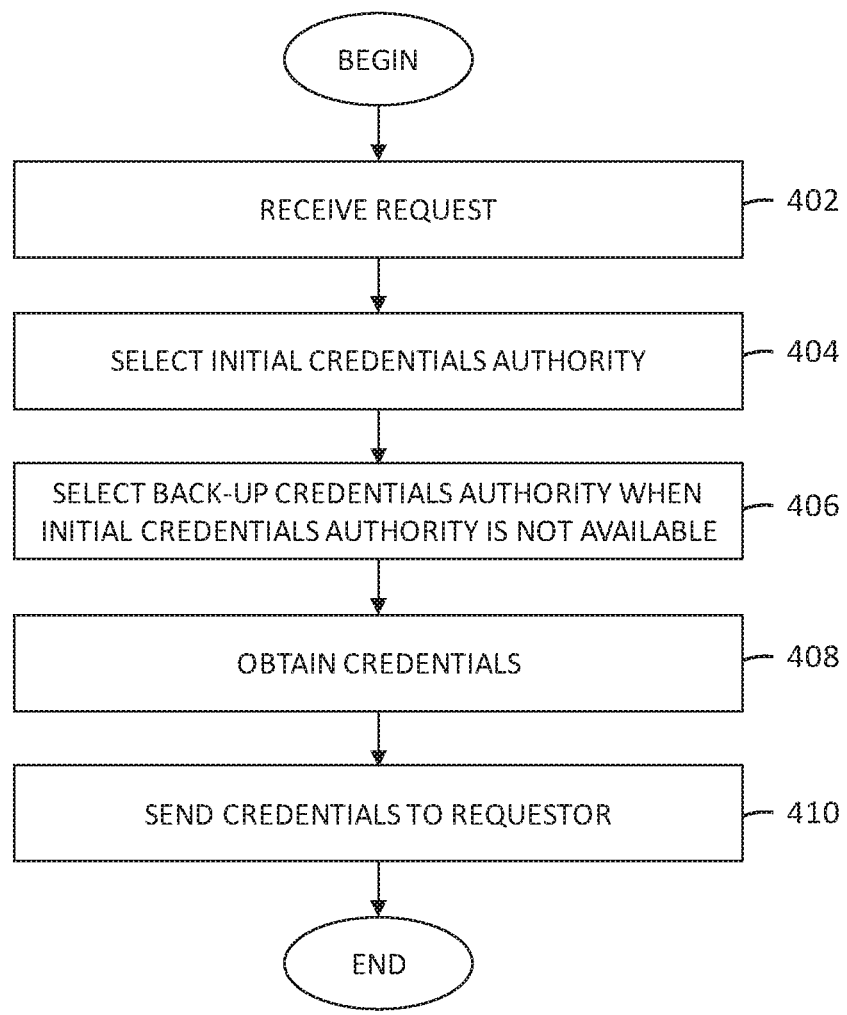
FIG. 4 comprises a flow chart of an approach for selecting a credentials authority according to various embodiments of the present invention.

Referring now to FIG. 4, one example of an approach for selecting a credentials authority is described. In some aspects these approaches are executed at the cloud. In other examples, these approaches are executed at a remote industrial site. In some other examples, the initial credentials authority and the back-up credentials authority are certificate authorities.

At step 402, a request is received from a requestor for security credentials. In aspects, the requestor is a device or a software application. In other aspects, the requestor is an industrial machine that is disposed at an industrial site. In some examples, the security credentials comprise a PKI certificate.

At step 404, an initial credential authority is selected based upon a first predetermined criteria. In other examples, the first predetermined criteria relates to the position of the initial credentials authority on a list of potential credentials authorities.

At step 406 and when the initial credentials authority is not available, a back-up credentials authority is chosen based upon a second predetermined criteria. In some other examples, the second predetermined criteria relates to the position of the initial credentials authority on a list of potential credentials authorities.

At step 408, the security credentials are obtained from the back-up certificate authority. At step 410, the security credentials are transmitted to the requestor.

Figure 5:
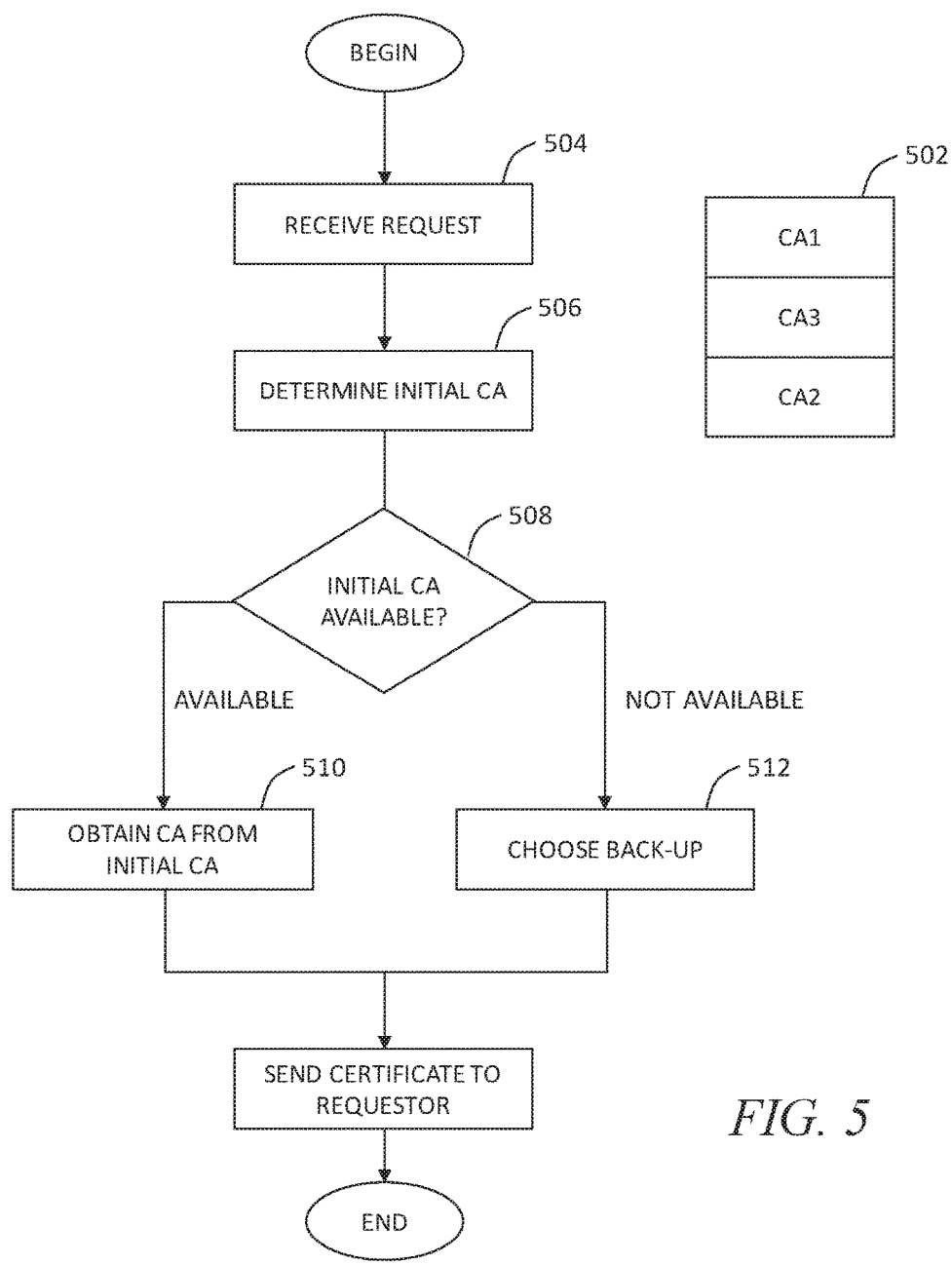
FIG. 5 comprises a flow chart of an approach for selecting a credentials authority according to various embodiments of the present invention.

Referring now to FIG. 5, one example of an approach for selecting a credentials authority is described. In this example, a list 502 includes a ranked ordering of credential authorities. The credential authorities may be certificate authorities (CAs), for example, that issue PKI certificates. The list, in this example, is an ordered list with a first CA1 being first, a third CA3 being second on the list, and a second CA2 being third on the list. When a selection is made, the first CA1 will be tried first, the third CA3 will be tried second, and the second CA2 will be tried third.

At step 504, a request from a requestor is received. The requestor may be a software application or a device.

At step 506, it is determined what the initial CA will be. For example, the list 502 is examined.

At step 508, it is determined if the initial CA is available. In aspects, a message may be sent to the CA to determine availability. In other aspects, the CA may periodically report its status and this status may be examined to report its availability.

At step 510, when the initially-selected CA is available then the certificate is obtained from the CA and the certificate is sent to the requestor. In this case, CA1 is selected since it is first on the list, the certificate from CA1 is obtained, and then this certificate is sent to the requestor at step 514.

At step 512 and when the initially-selected CA is not available, a back-up CA is chosen. For example, the list 502 is consulted and the next CA on the list 502 (in this case CA3) is selected. Step 512 may be repeated until an available CA is determined.

At step 514, when the back-up CA is available then the certificate is obtained from the back-up CA and the certificate is sent to the requestor. In this case, the certificate obtained from CA3 is selected since it is first on the list.

It will be appreciated by those skilled in the art that modifications to the foregoing embodiments may be made in various aspects. Other variations clearly would also work, and are within the scope and spirit of the invention. It is deemed that the spirit and scope of the invention encompasses such modifications and alterations to the embodiments herein as would be apparent to one of ordinary skill in the art and familiar with the teachings of the present application.

What is claimed is:

1. A method for determining a credential authority, the method comprising:
   receiving at a multi-certificate authority (CA) apparatus an electronic enrollment request from a requestor electronic device for security credentials, the requestor electronic device being selected from the group consisting of: an industrial machine, a computing device, and a vehicle;
   at an electronic control circuit at the multi-CA apparatus, selecting an initial credential authority based upon a first predetermined criteria;
   communicating by the multi-CA apparatus with the initial credentials authority and, based upon the communicating, determining at the electronic control circuit whether the initial credential authority is available, wherein the communicating occurs utilizing a first plug-in apparatus, the first plug-in apparatus being a software program that allows the multi-CA apparatus to communicate with the initial credentials authority;
   wherein a data structure is stored in a data storage device, the data structure including a ranked list of potential credentials authorities, and the first predetermined criteria relates to the position of the initial credentials authority within the list of potential credentials authorities;
   when the initial credentials authority is available, obtaining the security credentials from the initial credentials authority and transmitting the security credentials to the requestor electronic device;
   when the initial credentials authority is not available, choosing a back-up credentials authority based upon a second predetermined criteria;
   wherein the second predetermined criteria is the position of the back-up credentials authority within the list of potential credentials authorities;
   communicating by the multi-CA apparatus with the backup credentials authority and, based upon the communicating, determining at the electronic control circuit whether the back-up credential authority is available, wherein the communicating occurs utilizing a second plug-in apparatus, the second plug-in apparatus being a software program that allows the multi-CA apparatus to communicate with the back-up credentials authority;
   when the back-up credentials authority is available, obtaining the security credentials from the back-up credentials authority and transmitting the security credentials to the requestor electronic device;
   when the back-up credentials authority is not available and at the electronic control circuit, attempting to identify a next available back-up credentials authority on the list until the list is exhausted.

2. The method of claim 1, wherein the requestor electronic device is an industrial machine that is disposed at an industrial site.

3. The method of claim 1, wherein the security credentials comprise a PKI certificate.

4. The method of claim 1, wherein the method is executed at the cloud.

5. The method of claim 1, wherein the method is executed at a remote industrial site.

6. The method of claim 1, wherein the initial credentials authority and the back-up credentials authority are certificate authorities.

7. A multi-Credentials Authority (CA) apparatus that is configured to determine a credentials authority, the multi-CA apparatus comprising:
   an electronic interface with an input and an output, the interface being configured to receive an electronic enrollment request from a requestor electronic device for security credentials at the input, the requestor electronic device being selected from the group consisting of: an industrial machine, a computing device, and a vehicle;
   a data storage device, the data storage device being configured to store a data structure that includes a ranked list of potential credentials authorities;
   a first plug-in apparatus, the first plug-in apparatus being a software program that allows the multi-CA apparatus to communicate with the initial credentials authority;
   a second plug-in apparatus, the second plug-in apparatus being a software program that allows the multi-CA apparatus to communicate with a back-up credentials authority;
   an electronic control circuit coupled to the electronic interface and the data storage device, the electronic control circuit being configured to select the initial credential authority from the list based upon a first predetermined criteria, the first predetermined criteria relating to the position of an initial credentials authority within the list of potential credentials authorities, the electronic control circuit further configured to communicate with the initial credentials authority via the interface and, based upon the communicating, determine whether the initial credential authority is available, wherein the communicating occurs utilizing the first plug-in apparatus, the electronic control circuit further configured to, when the initial credentials authority is available, obtain the security credentials from the initial credentials authority and transmit the security credentials to the requestor electronic device via the output, the electronic control circuit further configured to, when the initial credentials authority is not available, choose the back-up credentials authority from the list based upon a second predetermined criteria, wherein the second predetermined criteria is the position of the back-up credentials authority within the list of potential credentials authorities, the electronic control circuit further configured to communicate with the backup credentials authority and, based upon the communicating, determine whether the back-up credential authority is available, the electronic control circuit further configured to, when the back-up credentials authority is available, obtain the security credentials from the back-up credentials authority and transmit the security credentials to the requestor electronic device via the output, the control circuit further configured to, when the back-up credentials authority is not available, attempt to identify a next-available back-up credentials authority on the list until the list is exhausted.

8. The multi-CA apparatus of claim 7, wherein the requestor electronic device is an industrial machine that is disposed at an industrial site.

9. The multi-CA apparatus of claim 7, wherein the security credentials comprise a PKI certificate.

10. The multi-CA apparatus of claim 7, wherein the multi-CA apparatus is disposed at the cloud.

11. The multi-CA apparatus of claim 7, wherein the multi-CA apparatus is disposed at a remote industrial site.

12. The multi-CA apparatus of claim 7, wherein the initial credentials authority and the back-up credentials authority are certificate authorities.

\* \* \* \* \*